Nov. 26, 1957  H. F. OLSON ET AL  2,814,353
TRANSDUCER WITH FLUID FILLED DIAPHRAGM SUSPENSION
Filed Feb. 26, 1953

INVENTORS
Harry F. Olson &
John Preston
BY
ATTORNEY

United States Patent Office 2,814,353
Patented Nov. 26, 1957

2,814,353

TRANSDUCER WITH FLUID FILLED DIAPHRAGM SUSPENSION

Harry F. Olson, Princeton, and John Preston, Metediconk, N. J., assignors to Radio Corporation of America, a corporation of Delaware Application February 26, 1953, Serial No. 339,014

7 Claims. (Cl. 181—31)

The present invention relates to suspensions for the vibratory parts of acoustical apparatus, such, for example, as a suspension for a transducer diaphragm, and, more particularly, although not necessarily exclusively, to novel suspensions for a transducer vibratory part which are "limp" but will not suffer an out of phase vibration in any section of the frequency range of vibration and will provide high damping in the high frequency range.

The direct acting diaphragm most generally used in a transducer, such as a conventional dynamic cone loudspeaker, exhibits a non-uniform response frequency characteristic because of the performance of the suspension system. If the suspension is stiff, the low frequency response is inadequate and the high frequency response is non-uniform. A less stiff or "limper" suspension, provided in accordance with the prior art improves low frequency response but introduces other irregularities in operation such as non-uniform response in the mid-frequency range which is due to vibrations of the conventional paper suspension system which do not correspond to the vibration of the cone in either amplitude or phase. The non-uniform response in the high frequency range is due to inadequate damping by the conventional paper suspension system.

An important object of this invention is to provide an improved suspension system for a diaphragm thereby to obtain an adequate low frequency response and a smooth high frequency response.

Another object of this invention is to provide an improved suspension system for a diaphragm thereby to obtain a uniform response in the mid-frequency range.

A further object of this invention is to provide an improved acoustical diaphragm suspension which will provide a uniform response above 1,000 cycles.

Still another object of the invention is to provide an improved loudspeaker suspension system which will not vibrate out of phase in the mid-frequency range and which will provide high damping in the high frequency range.

A still further object of the invention is to provide a loudspeaker suspension system which is inexpensive and extremely efficient in use.

In accordance with the invention, there is provided a flexible fluid filled membrane which is disposed between the body of a diaphragm and the edge support for the diaphragm. The fluid filled membrane may be made from one of the types of thermoplastic materials of which vinylite is an example. The vinylite membrane is formed from flat circular pieces which are electronically stitched, glued or otherwise joined so as to provide a device in the nature of a hollow tube. A flap of material remains after the joining operation on either side of the tube. These two flaps provide sufficient area for attachment to the body of the diaphragm and the edge support for the diaphragm, respectively.

The novel features that are considered characteristic of the invention are set forth with particularity in the appended claims, the invention itself, however, both as to its organization and method of operation as well as additional objects and advantages thereof, will be best understood from the following description of several embodiments thereof, when read in connection with the accompanying drawing, in which:

Figure 1:
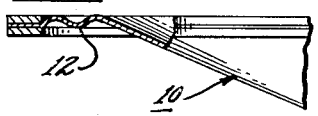
Fig. 1 is a schematic representation of a conventional loudspeaker cone suspension system.

Referring more specifically to the drawing, there is shown in Fig. 1 a sectional view of a cone 10 and the peripheral paper suspension system 12 for a conventional loudspeaker. The response frequency characteristic is shown illustratively in Fig. 2. It will be seen from the curve in Fig. 2, that the low frequency response is inadequate and that the high frequency response above 1,000 cycles is non-uniform.

Figure 3:
Fig. 3 is a schematic representation of a cone suspension system with a lower stiffness than that of Fig. 1.
Figure 4:
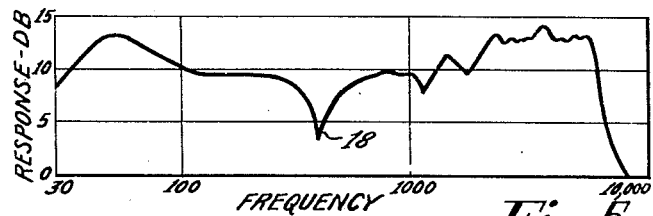
Fig. 4 is a diagram of the cone and suspension system of Fig. 3 vibrating out of phase.
Figure 5:
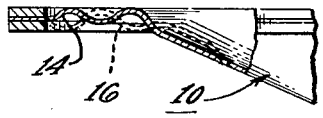
Fig. 5 is a graph showing the response characteristics resulting from the out of phase vibration illustrated in Fig. 4.

The low frequency response can be improved by using a more elastic suspension, that is, a loudspeaker diaphragm suspension system with a lower stiffness. This can be accomplished by using a wider suspension 14 as illustrated in Fig. 3. However, this permits a vibration which is out of phase with the vibration of the loudspeaker cone 10 as shown in Fig. 4. This leads to a dip 18 in the response frequency characteristic around 600 cycles as shown in Fig. 5. However, the low frequency response is shown to have been improved as illustrated in Fig. 5.

Figure 2:
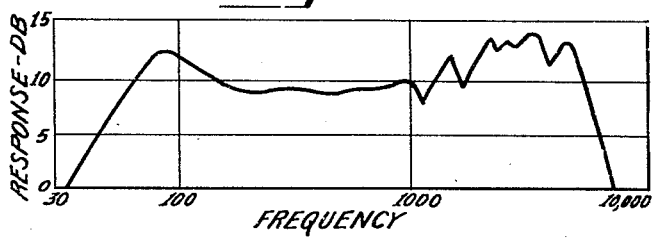
Fig. 2 is a graph representing the response frequency characteristics of the loudspeaker suspension of Fig. 1.

Referring to the curves illustrated in Figs. 2 and 5, it will be seen that the response frequency characteristics are ragged above 1,000 cycles. This is due to the very small damping effect offered by the paper suspension.

Thus it will be seen that the conventional suspension produces two deleterious effects, namely, a dip in the response frequency characteristic in the mid-frequency range and a ragged response in the response frequency characteristic in the high frequency range. The present invention overcomes defects of known suspensions by providing a limp or elastic suspension which will not vibrate out of phase in the mid-frequency range and yet will provide high damping in the high frequency range.

Vinylite will provide high damping and smooth out the response above 1,000 cycles. However, assuming the suspension member to be made in the shape of the suspension shown in Fig. 1, it will still be too stiff and the low frequency response will be attenuated. If, on the other hand, the vinylite suspension is made as is the suspension of Fig. 3, it will vibrate out of phase, as illustrated in Fig. 4, and produce the dip 18 around 600 cycles (shown in Fig. 5).

Figure 6:
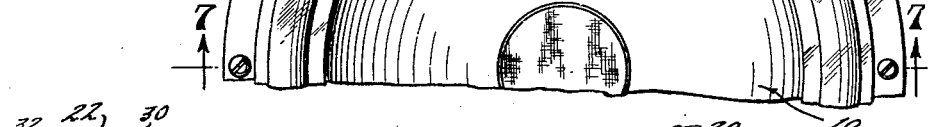
Fig. 6 is a plan view of a loudspeaker suspension as taught by the present invention.
Figures 7, 9:
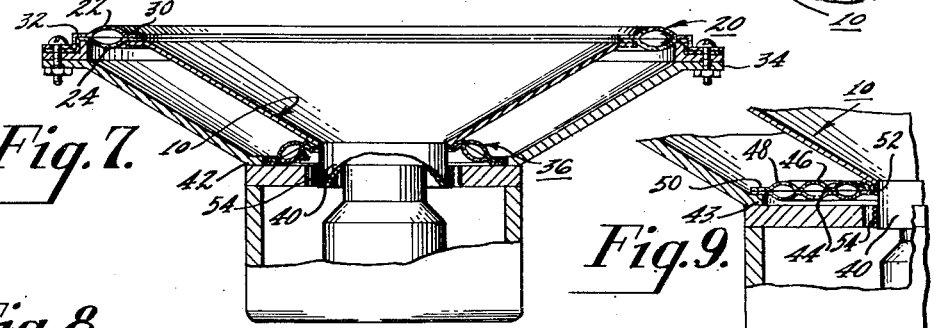
Fig. 7 is a sectional view of the fluid filled membrane as described in the invention.
Fig. 9 is a view in cross section of a modification of the invention.
Figure 8:
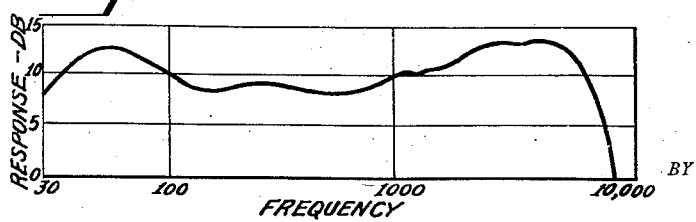
Fig. 8 is a graph showing the response characteristics obtained by means of the device of the present invention.

In the embodiment of the invention shown in Fig. 7, there is provided a fluid filled membrane 20. This membrane is or may be constructed of plastic material in a manner to provide a hollow space which is filled with air, for example, a plastic material, such as vinylite (a vinyl resin, one of the polymers of vinyl acetate or vinyl chloride, or copolymers of mixture thereof) is desirable for purposes of this invention. Two flat circular discs or rings 22 and 24 of vinylite material of predetermined inner and outer diameters are cut in the configuration shown in Fig. 6. The inner 26 and outer 28 edges of the vinylite rings are or may be fastened together by application of heat, for example. Heat may be applied by using a high frequency heat source such as that incorporated in an electronic sewing machine. Air under pressure is forced into the resulting membrane so that a resilient air filled annular member is thus produced. The inner and outer electronic welds are of sufficient strength to retain the air or gas, e. g. nitrogen, supplied internally of the membrane while at the same time providing an inner rim or lip 30 and outer lip 32 portion for attachment of the membrane 20 to the loudspeaker and the loudspeaker frame member or support 34, respectively. The inner vinylite lip 30 is or may be cemented to the loudspeaker cone 10. The outer vinylite lip 32 is securely attached as by cementing or bolting to the peripheral edge support 34 for the loudspeaker cone. By making the vinylite suspension membrane 20 as shown in Figs. 6 and 7, the cone 10 and suspension 14 out of phase vibration Fig. 4 is eliminated. And, since the cone suspension 20 is made of vinylite, it provides high damping and a smooth high frequency response characteristic. The response frequency characteristic of the device of the present invention is illustrated by means of the curve of Fig. 8. It will be seen that adequate low frequency response is obtained without the dip at 600 cycles and the high frequency response is smooth above 1,000 cycles.

A second vinylite air filled membrane 36 is or may be disposed at the base of the loudspeaker cone assembly, at the junction of the voice coil suspension 40 and the bottom inner edge of the cone support 42. Another modification for this purpose is shown in Fig. 9. This system comprises a multi-element elastic member which consists of three separate air filled sections, 44, 46 and 48. The three sections are sealed or joined at their respective adjacent peripheral edges in the manner before mentioned. The outermost edge having a lip or rim 50 remaining after the sealing operation, is secured to the bottom portion of the frame member 43 by the application of suitable cement or it may be bolted thereto. The inner edge or rim 52 is attached in like manner, as above, to the voice coil suspension 40 immediately adjacent the voice coil 54. This modification results in a smooth high frequency response.

There has thus been described a novel loudspeaker cone suspension system utilizing a resilient plastic membrane and which provides an inexpensive, efficient and easily adaptable means for providing a practically uniform frequency response out to almost 10,000 cycles.

What is claimed is:

1. A resilient loudspeaker diaphragm suspension member for mounting on a support comprising a hollow membrane, said membrane comprising a plurality of annular members of flexible material secured together at their outer and inner peripheries, said membrane being provided with an inner and an outer rim of flexible material, means to secure said outer rim of said membrane to said support and means to secure said inner rim of said membrane to a diaphragm.

2. The invention according to claim 1 wherein said inner and outer rims of flexible material are integral with said annular members.

3. The invention according to claim 1 wherein said annular membrane is inflated with a gas.

4. In a loudspeaker provided with a diaphragm having a peripheral edge portion, a support for said diaphragm which comprises a resilient, hollow, annular tube, said tube being gas inflatable and provided with an inner and an outer rim, and means to secure said inner rim to said peripheral edge of said diaphragm.

5. The invention according to claim 4 wherein said resilient tube comprises a vinylite member.

6. In combination with a loudspeaker diaphragm, a suspension for the edge of said diaphragm comprising a support, a fluid filled member, said member including an air tight compartment for containing a fluid, said member having an inner and an outer rim of flexible material, means for connecting said outer rim to said support, and means for connecting said inner rim to said loudspeaker diaphragm edge.

7. In combination with a loudspeaker diaphragm having an inner peripheral edge and an outer peripheral edge, a support, a flexible suspension member adapted to contain a fluid therein, said member being provided with an inner and an outer rim, means connecting said outer rim to said support, means connecting said inner rim to said outer peripheral edge of said diaphragm, a second flexible suspension member adapted to contain a fluid therein, said second member being provided with an inner and an outer rim, means connecting said outer rim of said second member to said support, and means connecting said inner rim of said second member to said inner peripheral edge of said diaphragm.

References Cited in the file of this patent

UNITED STATES PATENTS

| Number | Name | Date |
|---|---|---|
| 749,360 | Cheney | Jan. 12, 1904 |
| 1,372,054 | Warner | Mar. 22, 1921 |
| 1,416,582 | Sealey | May 16, 1922 |
| 1,454,913 | Tigerstedt | May 15, 1923 |
| 1,634,662 | Gruber | July 5, 1927 |
| 1,687,359 | Baldwin | Oct. 9, 1928 |
| 1,744,032 | Baldwin | Jan. 21, 1930 |
| 2,646,853 | Pocock | July 28, 1953 |

FOREIGN PATENTS

| Number | Country | Date |
|---|---|---|
| 337,299 | Germany | May 30, 1921 |
| 622,598 | France | June 1, 1927 |